United States Patent [19]

Callon

[11] Patent Number: 5,583,862
[45] Date of Patent: Dec. 10, 1996

[54] METHOD AND APPARATUS FOR ROUTING FOR VIRTUAL NETWORKS

[75] Inventor: Ross W. Callon, Bedford, Mass.

[73] Assignee: Bay Networks, Inc., Santa Clara, Calif.

[21] Appl. No.: 411,442

[22] Filed: Mar. 28, 1995

[51] Int. Cl.⁶ .................................................. H04L 12/56
[52] U.S. Cl. ........................................... 370/397; 370/402
[58] Field of Search ........................ 370/60, 60.1, 85.13, 370/85.14, 94.1, 94.2, 94.3, 54; 340/825.52, 825.53, 825.54; 395/200.15

[56] References Cited

U.S. PATENT DOCUMENTS

| 4,823,338 | 4/1989 | Chan et al. | 370/85.1 |
|---|---|---|---|
| 5,029,164 | 7/1991 | Goldstein | 370/95.1 |
| 5,128,926 | 7/1992 | Perlman et al. | 370/94.1 |
| 5,200,993 | 4/1993 | Wheeler et al. | 379/96 |
| 5,247,524 | 9/1993 | Callon | 371/53 |
| 5,251,205 | 10/1993 | Callon et al. | 370/60 |
| 5,410,543 | 4/1995 | Seitz et al. | 370/85.13 |
| 5,444,702 | 8/1995 | Burnett et al. | 370/60.1 |

OTHER PUBLICATIONS

Callon, "The Interoperability Report", Aug. 1989, vol. 3, No. 8, pp. 2–6.
Katz, et al, "NBMA Next Hop Resolution Protocol (NHRP)", Aug. 25, 1994, pp. 1–29.
Dykeman, et al. "ATM Forum 94–0471R7 PNNI Draft Specification", pp. 11–110.

Primary Examiner—Hassan Kizou
Attorney, Agent, or Firm—Blakely, Sokoloff, Taylor & Zafman

[57] ABSTRACT

An internetwork routing protocol which supports virtual networks. Routing tables are maintained in routers or gateways which identify whether or not a destination is directly reachable by the router listed in the routing information entry, or whether it is merely part of a virtual network served by the listed destination routers. For directly reachable connections, datagrams may be directly delivered to any router claiming such status with respect to the network with assurance of likely delivery to the destination. Routers in communication with a virtual network must first be queried for the identity of a particular destination router address before packets are delivered to eliminate the need of packet forwarding.

26 Claims, 4 Drawing Sheets

Routing Table Entry
Link State Packet Contents

Routing Table Entry
Link State Packet Contents

METHOD AND APPARATUS FOR ROUTING FOR VIRTUAL NETWORKS

BACKGROUND OF THE INVENTION

1. Field of the Invention

The present invention relates to internetwork communications. More particularly, the present invention relates to a method and apparatus for internetwork routing in systems that include virtual networks.

2. Art Background

Computer networks are implemented to exchange information from one location to another. The information may be data exchanged between users of the computer network, or data propagated from one user to a peripheral device such as a printer or remote data storage location. In recent years, networking systems have spread worldwide, increasing the efficiency of user's working habits by increasing the volume of information that can be exchanged almost instantaneously from one location to another. The effect has been revolutionary. Today, even personal communications and document delivery are handled via electronic mail where, in the past, other means of communicating would have been required.

The proliferation of computer networks has necessitated the development of internetworking communications devices. These devices, often referred to as routers or gateways, provide a mechanism for users (or nodes) of one network to communicate with users (or nodes) of another network. U.S. Pat. No. 5,251,205 issued to Ross W. Callon et al. teaches a method for multiple protocol routing wherein data packet formats appropriate for one network are in an inappropriate format for a second network and require a special treatment prior to propagation from the first network to the second network. The role of routers or gateways is to provide a communications path between interconnected networks regardless of the protocols implemented by the various networks.

In order to propagate information from a node on one network to a node or group of nodes on other networks, it is necessary to determine a path through the interconnected series of links and networks for the data to be propagated. Numerous routing protocols have been developed for calculating routes over interconnected networks. "Computer Networks", second edition, Andrew S. Tanenbaum, Prentice-Hall, 1988, pp. 289–309, describes numerous such routing protocols. In popular routing algorithms, such as those described in Tanenbaum, each router determines which end systems are attached to it, what links to other routers are available, the states of those links, and the identities of the routers on the other ends of those links. To initialize an internetwork environment, each router places this information in a control packet known as a Link State Packet (LSP), and transmits this LSP to all of the other routers in the internetwork. Later, when changes in the network occur, one or more routers may generate new LSPs which supersede previously generated LSPs.

As long as the most recent LSPs are propagated reliably to all of the routers, each router will have complete information about the topology of the internetwork environment and can generate a routing database describing routes through the internetwork. In order for user data packets to be delivered to their destinations, each end system on the internetwork environment must have an unambiguous address. There are several independent standards organizations which document and promulgate address allocation schemes, as well as control end user data packet formats which may be used for communicating under these schemes. Many networks and internetworks interconnected through current routing technologies have been configured according to these addressing schemes and formats.

Recent advances in networking theory have introduced the concept of "virtual networks" or virtual subnetworks. One reason for the introduction of virtual networks is for the support of mobile end stations. While a mobile end station may have a unique address, its physical location may vary from time to time. It would be inefficient for every other user on an interconnected series of networks to have to update their address tables every time every mobile end station changed physical locations. Thus, it is convenient for mobile stations to maintain a single (virtual) address for which all other end stations or nodes can use to reach it. Additionally, virtual networks are useful for giving a common group of end stations an address which implies a common subnetwork address, even though those end stations may actually be distributed over numerous physical networks. The distributed subnetworks combine to comprise the virtual network. This ability is gaining in commercial importance. Thus, a number of host systems comprising a single subnetwork with an address identifier which identifies that subnetwork may in fact be interconnected through different routers.

A likely typical situation for implementing virtual networks concerns the routing of the internetwork protocol (IP) type networking packets over an asynchronous transfer mode (ATM) network. The ATM protocols define the need for coordination of route computation between multiple systems serving the same network using emerging LAN Emulation protocols.

Under existing routing protocols such as the Internetworking Protocol (IP), there is no provision for Link State Packets to be formulated by a router which identifies whether or not a router is connected to all hosts of a given network, or is merely capable of answering queries regarding the hosts of a distributed virtual network. That is, when a virtual network is distributed over several routers, each router can only identify in its LSP that the subnetwork is (eventually) reachable from it. There is no way to identify that the router is not directly in communication with all nodes of the network. Currently, this is no different from information provided by a router which is directly connected to all hosts on a real physical network. Packets forwarded to a router connected to a virtual network, but not to a router physically coupled to the destination host will have to be forwarded to the correct router within the virtual network which is connected to the host. This is inefficient. As an alternative, prior to routing data from one host on one network connected to a router to another network connected to a different router, the sending or originating router may send a query to some or all of the routers which claim a connection to the virtual destination network asking for an actual physical router address to send to which is connected to the desired host. This mechanism, however, is inefficient for those routers which are directly connected to all hosts of a physical destination network. It would be desirable, and is therefore an object of the present invention, to provide a routing mechanism which efficiently handles the case of an interconnected series of networks which may include both distributed virtual networks and discrete physical networks.

SUMMARY OF THE INVENTION

From the foregoing, it can be appreciated that it would be desirable to provide a routing mechanism which supports an interconnected series of networks wherein some networks comprise subnetworks which are distributed over a virtual network. Further, it is an object of the present invention to support efficient routing in an internetwork environment which includes such virtual networks.

These and other objects of the present invention are provided by a new internetworking routing protocol in which link state packets (LSP) propagated by routers include information which indicates whether a given network is a directly reachable one, or one that is a virtual network only partially connected to the router. The routers implementing this protocol will maintain in their routing tables this virtual network identification information about which networks are "directly reachable" by the other routers in the system in which ones are merely "address served" by the other routers in the internetwork environment.

In one embodiment of the present invention, the specification of the network connection type (physical or virtual) is provided by data included in the routing topology information propagated between routers in the internetwork environment. In an alternative embodiment, the routing protocol may be implemented by having a router identify that it is first providing addresses for one type of network connection and then providing the network addresses for a second type of network. For example, physical network information may be followed by virtual network information.

With routers that implement the internetwork routing protocol of the present invention, data packets or datagrams that need to be sent from one location to another location can be most efficiently directed. For example, if two routers are listed in an originating router's routing tables as being directly reachable with respect to a destination network, the originating router may deliver the packet to either one of those two routers based on conventional routing algorithms with assurance that the datagram will reach its destination node with a high probability. It is unnecessary for the originating router to query the two "directly connected" routers as to which one should receive the datagram for a given host destination. For a situation where two routers are listed as "address served" routers in the originating router's routing tables, the router knows that the destination network is a virtual network. In this case the originating router should query one or both of the routers connected to the destination network for a true physical destination router address to deliver the packet. In this manner, routers connected to virtual networks are queried while routers connected to a physical network may immediately be forwarded packets without the delay of a query.

BRIEF DESCRIPTION OF THE DRAWINGS

The objects, features and advantages of the present invention will be apparent from the following detailed description in which.

DETAILED DESCRIPTION

The present invention provides a method and apparatus for packet routing over an internetwork environment which include both physical and virtual networks. In the following detailed description, specific details are set forth such as particular routing protocols and specific bit designations in order to provide a thorough understanding of the present invention. It will be appreciated, however, by one skilled in the art that the routing techniques defined in accordance with the present invention may be practiced over numerous internetwork topologies using numerous network protocols. In other instances, well-known control structures and gate level circuits have not been shown in detail in order to avoid obscuring the present invention.

Figure 1:
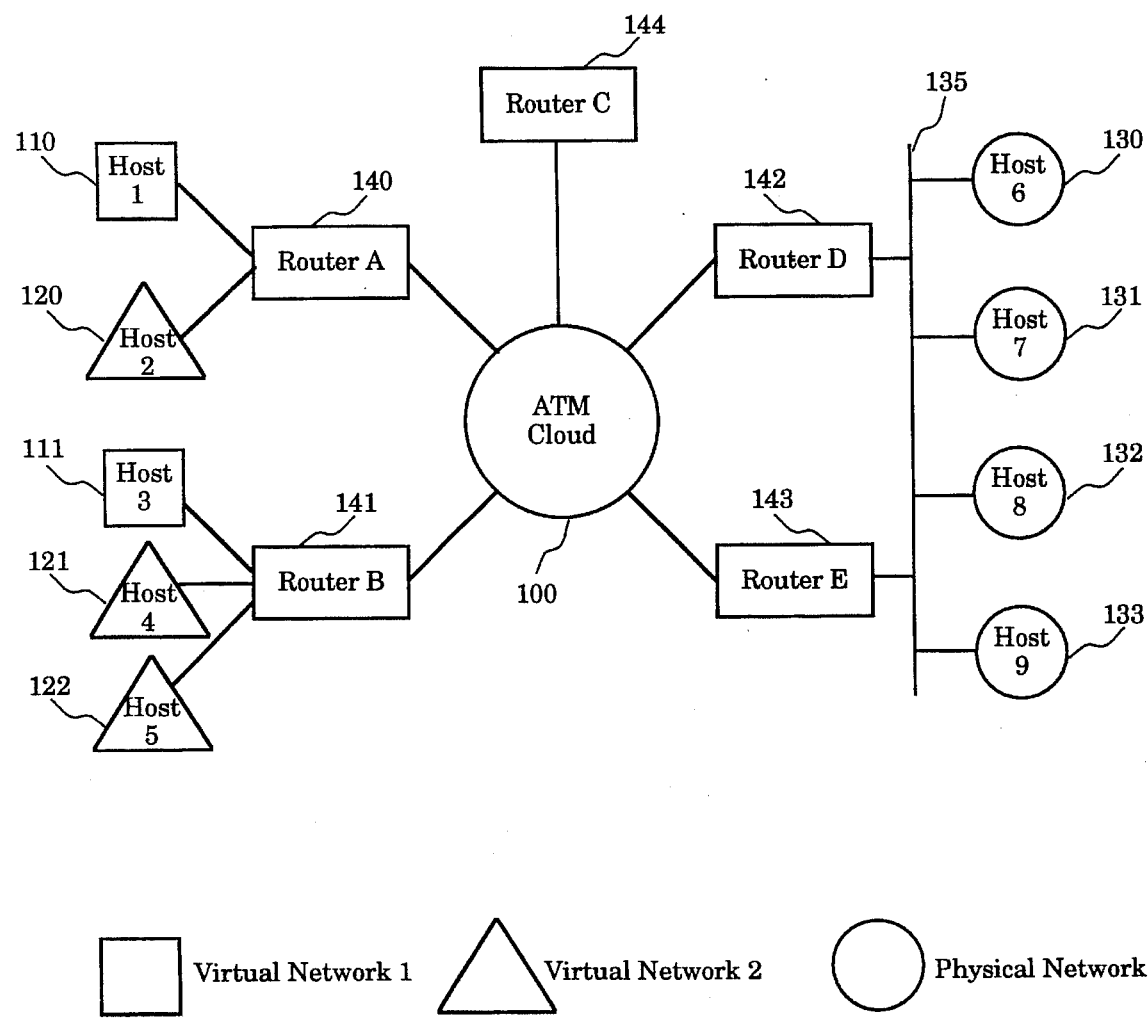
FIG. 1 illustrates a hypothetical internetwork environment which includes both virtual and physical networks.

Referring first to FIG. 1, a hypothetical internetwork environment configuration is illustrated in an embodiment in which virtual networks are likely to be utilized. There is shown at the center of the internetwork environment a digital network interface metaphorically referred to as an asynchronous transfer mode (ATM) cloud 100, which systems are becoming well known in the art for providing virtual channels for interconnections between routers connecting various networks.

The use of an internetwork configuration which includes the ATM cloud 100 is a suitable example for implementing the present invention because a likely scenario for the implementation of virtual networks will include the routing of internetwork protocol (IP) packets over an ATM network. This type of network will require coordination between the multiple routers that serve the same distributed virtual network to be handled using developing techniques of LAN Emulation and for Multiplexed Over ATM (MPOA). For purpose of the present invention, it is assumed that the multiple routers servicing an identified virtual network will be able to coordinate amongst themselves for determining which router is in fact physically in communication with a subnetwork of the virtual network coupled to a desired host station.

In the illustrated internetwork configuration of FIG. 1, there are actually illustrated three networks. Host systems 1 and 3 (110, 111) are on Virtual Network 1 and are illustrated geometrically coded as boxes. This implies that, for example, the network layer addresses for Hosts 1 and 3 will be assigned based on their attachment to the "box" network. Hosts 2, 4, and 5 (120, 121 and 122) are on a separate virtual network, Virtual Network 2, illustrated using triangular shaped host systems. Hosts 6, 7, 8 and 9 (130, 131, 132 and 133) are on a real physical network 135 noted as the Physical Network with circular shaped host designations in the figure.

As described in the preceding section, with previous routing protocols, router A 140 and router B 141 would each announce reachability to Virtual Network 1 and Virtual Network 2. Each is connected to a subnetwork of hosts residing on the virtual network. Similarly, router D 142 and router E 143 would each announce to the other routers their reachability to the circular physical network 135.

The deficiency of preceding protocols can best be illustrated with the following examples: suppose that two datagrams (for example, two IP packets) arrive at router C 144 and need to be delivered to their respective destinations. The first packet is addressed to Host 5 (122) on the triangular virtual network. The second packet is addressed to Host 9 (133) on the physical network 135. In both of these cases, there are two routers which are announcing reachability to the desired destination network. However, in this case traditional routing protocols do not provide for router C 144 to know which reachability information announced through the routing protocol is for the virtual networks such as the triangular and square virtual networks, and which identifies reachability to a real physical network.

With traditional routing protocols, inefficient operation is likely in one or both of the above cases. There are two approaches which could be used: (i) use routes to any router announcing reachability to the associated network, and rely on the router to forward the packet if necessary. An example of how this may be suboptimal is that the packet from router C 144 for host 5 (122) may be sent first to router A 140 which will then have to forward the packet to router B 141 before delivery to Host 5 (122); (ii) before sending the packet, send a query to one of the routers announcing reachability to the associated network, and wait for a response before forwarding to the packet. This would allow the routers serving the network to coordinate amongst themselves and determine which router should receive the packet for delivery to the destination host. In the above example, this is not an optimal approach because the packet that is destined for host 9 (133) will not be forwarded until after the response to the query is received, even though router D 142 and router E 143 which are both announcing reachability to the network containing Host 9 (133) can in fact both reach the entire physical network directly. This query approach is currently being considered for implementation with existing protocols in order to provide compatibility. It has been called the Next Hop Resolution Protocol (NHRP) which at least provides compatibility with the existing IP protocol.

The present invention proposes a solution such that the two packets described in the above example may both optimally be delivered to the destination hosts with no unnecessary delay.

Figure 2:
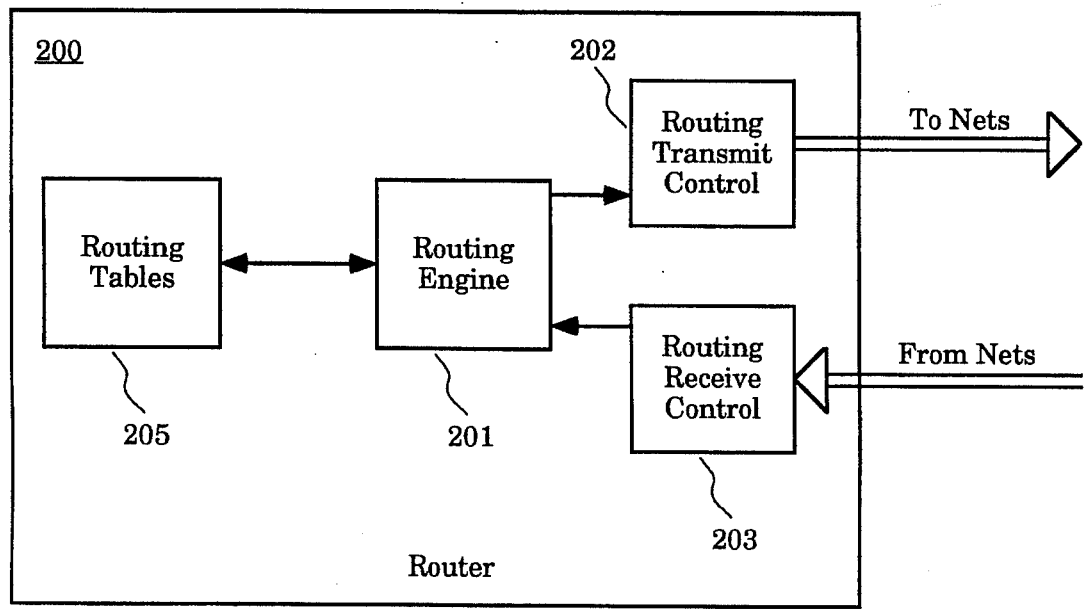
FIG. 2 illustrates a general block diagram of a router which may incorporate the teachings of the present invention.

FIG. 2 illustrates a general block diagram of a router 200. At its simplest reduction, the router 200 comprises a routing engine 201 which controls sending data packets and the above described link state packets to the other routers in the network through the routing transmit control block 202. Incoming data packets and link state packets are received from the other routers in the network through routing receive control block 203 for processing by the routing engine 201. The router 200 maintains in a memory device or other storage mechanism routing tables 205 derived in response to the link state packets and other control packets received by the router 200.

Figure 3:
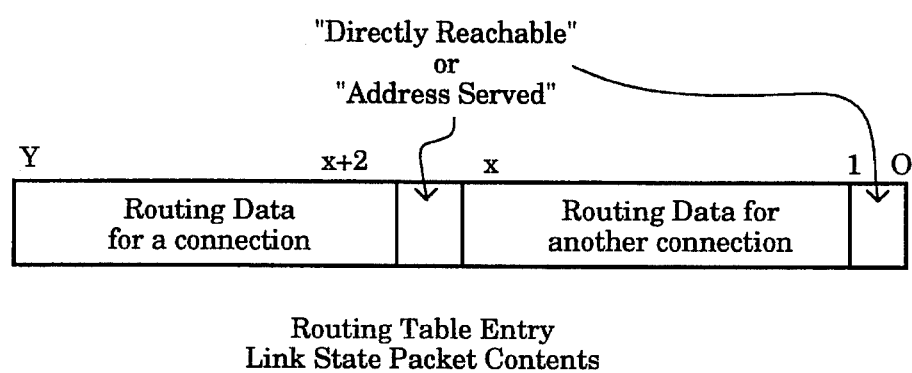
FIG. 3 illustrates the data assignment in a link state packet which provides information about the nature of a network connection for a router.

The present invention involves maintaining information concerning the direct reachability for directly connected physical networks and for the ability to answer queries for virtual networks while using the same packet routing protocol. Accordingly, when link state packets are exchanged between the routers of FIG. 1, routers A 140 and B 141 will each announce that they can answer queries related to the triangular and square virtual networks 1 and 2 to which they are both only partially connected. Routers D 142 and E 143 announce that they have direct reachability to the entire physical network noted by the circularly drawn hosts. In accordance with one embodiment of the present invention, this information is provided by including virtual network identification information in the link state packet as illustrated in FIG. 3 wherein for each connection advertised in the link state packet at least one bit is designated for indicating whether the sending router for the connection has a "directly reachable" connection to the entire physical network or whether it is merely an "address served" router for a portion of the virtual network which may have nodes connected to other routers. This same information is maintained in the routing table entries by the routers receiving this packet.

Figure 4:
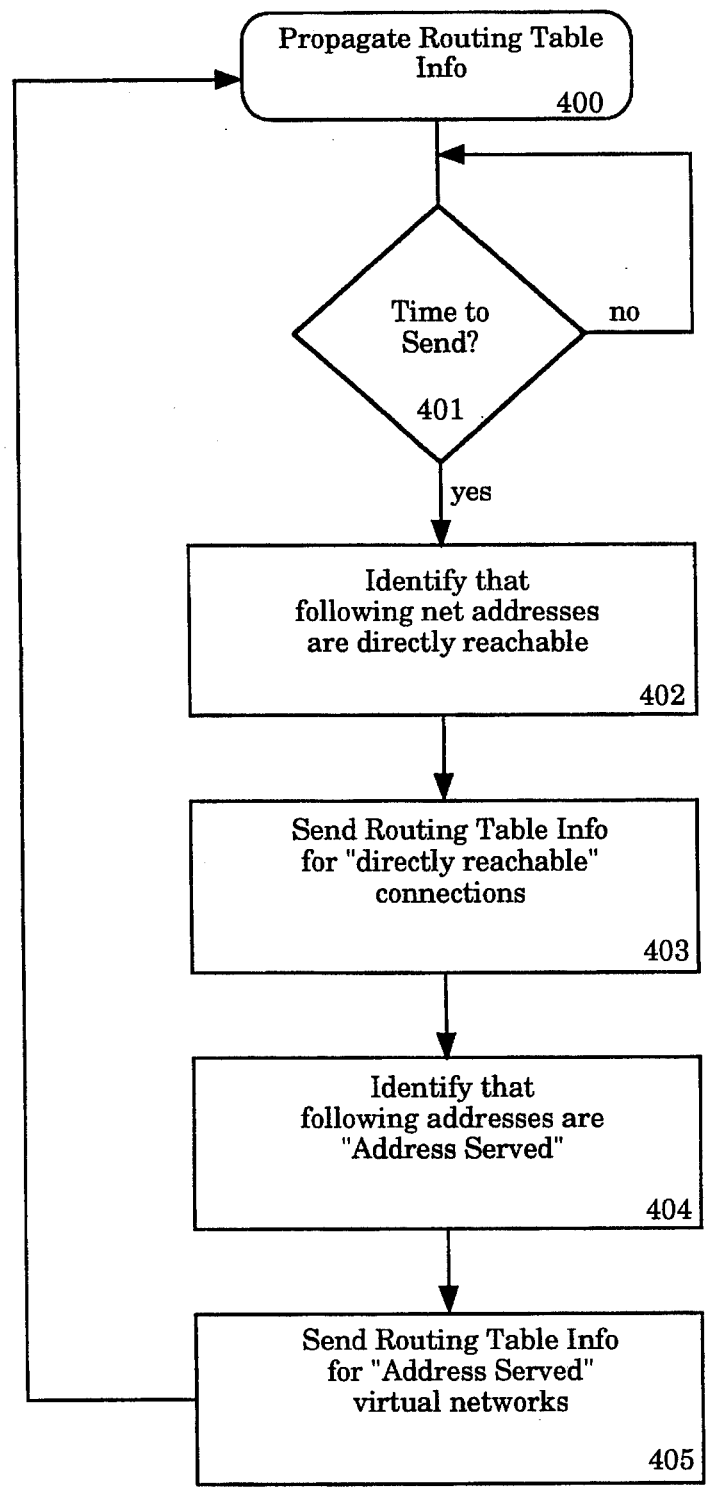
FIG. 4 is a flow diagram in accordance with an alternative embodiment of the present invention for providing network connection type information to interconnected routers of an internetwork environment.

FIG. 4 illustrates a flow diagram of a method for an alternative embodiment of the present invention which would not require changing current packet designations of bit assignments for the link state packets but does require a different handshaking protocol between the routers when providing the link state packets between them. The Propagate Routing Table Information routine 400 is a periodic routine which at decision box 401 determines if it is yet time to send the next set of link state information to the other routers in the internetwork environment. In accordance with this embodiment of the present invention, a router will divide the information it sends out into two parts. First, at step 402, it will propagate a message over the network identifying that the following packets are going to be the class of link state packets identifying "directly reachable" connections. This is followed at step 403 by sending the routing table information for those entries which correspond to directly reachable physical networks. Following that, at step 404, an indication is sent out from the router that the next set packets to follow contain addresses identifying connections for which the router is merely in the "address served" state suggesting that the network is virtual and may in fact have nodes which are connected to a different router. This is followed at step 405 by sending the routing table entries for the "address served" connections.

An internetwork environment implementing the above-described protocol for identifying directly reachable physical networks versus virtual networks allows for simple resolution of the delivery of the two datagrams described in the above example. The packet at router C 144 for delivery to Host 9 (133) can immediately be sent to either router D 142 or router E 143, in accordance with other routing criteria. Both of these routers are entirely connected to the physical destination network so that if the packet is sent from router C to either router D or router E, it will not have to be forwarded to another router but may then be delivered to Host 9 (133). Router C will determine that routers D and E both are directly reachable with respect to Host 9 by reference to the routing tables maintained by router C 144 based on link state packets which have earlier been transmitted by routers D 142 and E 143.

For the packet destined for Host 5, the router C 144 will determine by reference to its routing tables that both router A 140 and router B 141 have designated their connections to the Virtual Network 1 as being in the "address served" state as they are each only partially connected to the virtual network. Thus, the router C will send a query to either or both router A or router B to find out where to physically send the packet before delivering it.

Figure 5:
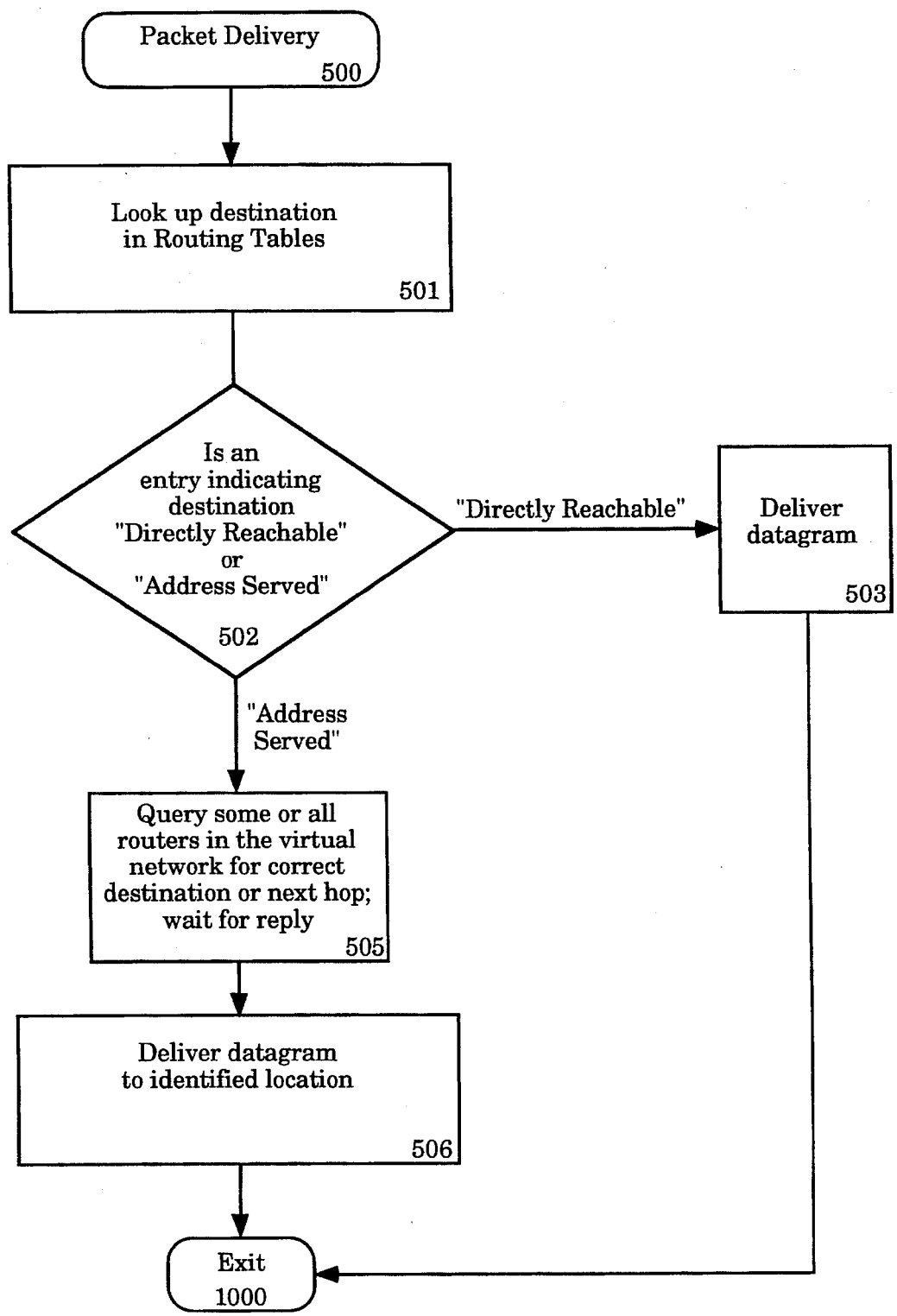
FIG. 5 illustrates a flow diagram suitable for use in implementing routing tables which incorporate the network connection type information of the present invention.

The Packet Delivery routine 500 is illustrated with reference to FIG. 5. At step 501, the router which has a packet to deliver will look up the destination in its routing tables. The originating router will then make a determination at decision box 502 as to whether or not the entry indicates that for the destination, the connection is "directly reachable" or "address served" for the router identified in the routing table entry. If an entry indicates that through a given router the destination is "directly reachable" at decision box 502 then the packet or datagram is delivered at step 503 without the delay of a query/response. If the originating router determines that the entry for the destination indicates that a destination router is an "address served" router for a virtual network, then at step 505 the router will send a query for a correct destination or the next hop for delivery of the packet; it then waits for a reply. Once the router has determined where to send the datagram, at step 506, it is delivered to the identified destination. The routine then ends at exit block 1000.

There has thus been described a protocol which may be implemented for both virtual and physical networks in an internetwork environment using a common packet protocol. Although the present invention has been described in terms of an illustrated embodiment, it will be appreciated by those of ordinary skill in the art that the present invention may be widely implemented over many interconnected network technologies. Accordingly, the scope of the present invention should be determined in terms of the claims which follow.

What is claimed is:

1. A router for use in an internetwork environment, the router comprising a routing table that stores link state packets, each link state packet providing information regarding an associated network coupled to an associated router of the internetwork environment and including virtual network identification information that identifies whether the associated network is a physical network directly reachable by the associated router or a virtual network partially connected to the associated router.

2. The router of claim 1 further comprising routing logic for controlling the delivery of a data packet to a destination network, said routing logic delivering said data packet directly to a second router coupled to said destination network if said virtual network identification information for said second router in said routing table memory indicates said destination network is a directly reachable network for said second router.

3. The router of claim 2 wherein said routing logic queries said second router for a delivery address for said data packet if said virtual network identification information for said second router in said routing table memory indicates said destination network is a virtual network only partially connected to said second router.

4. A method for delivering a data packet to a host on a destination network in a communications system including a first router and a second router, the second router being coupled to the destination network, the method comprising the steps of:

in said first router, maintaining a routing table which includes virtual network identification information indicating whether said destination network is directly reachable by said second router, or whether said destination network is only partially connected to said second router;

determining from said routing table if said destination network is directly reachable by said second router; and delivering said data packet to said second router if said destination network is identified as being directly reachable by said second router.

5. The method of claim 4 further comprising the steps of:

determining from said routing table if said destination network is only partially connected to said second router;

sending a query to said second router if it is only partially connected to said destination network requesting identification of a next router to deliver said data packet to;

waiting for a response to said query; and delivering said data packet to said next router.

6. The method of claim 5 wherein said determining steps are carried out by said first router referring to said routing table.

7. The method of claim 4 further comprising the step of said second router providing said virtual network identification information to said first router.

8. The method of claim 7 wherein said providing said virtual network identification information step comprises the steps of:

said second router determining if said destination network is entirely connected to said second router;

formulating a link state packet identifying said second router's virtual network identification information with respect to said destination network; and propagating said link state packet to said first router.

9. The method of claim 7 wherein said providing said virtual network identification information step comprises the steps of:

determining if said destination network is entirely connected to said second router;

notifying said first router that a first set of link state packets identify networks which are directly reachable by said second router;

including a link state packet for said destination network in said first set of link state packets if said destination network is entirely connected to said second router;

conveying said first set of link state packets to said first router;

notifying said first router that a second set of link state packets identify networks which are only partially connected to said second router; and including said link state packet for said destination network in said second set of link state packets if said destination network is only partially connected to said second router;

conveying said second set of link state packets to said first router.

10. A method for routing packets over a communications internetwork that includes both physical and virtual networks, said method comprising:

routers of said communications network exchanging connection information identifying which network connections are physical and which are virtual; and said routers thereafter routing packets according to the connection information.

11. The method of claim 10 further comprising:

directly delivering packets for a destination network to a router if connection information regarding the router identifies the router as having a physical network connection to said destination network; and sending a destination query to the router if connection information regarding the router identifies the router as having a virtual network connection to said destination network.

12. A method of delivering a data packet to a host on a destination network in a communications system, said communications system including a first router and a second router, the second router being coupled to the destination network, the method comprising the steps of:

maintaining a routing table, in the first router, which identifies the destination network as being either a physical or a virtual network;

receiving the data packet, for delivery to the host on the destination network, at the first router;

determining from the routing table whether the destination network is a physical or virtual network; and delivering the data packet to the second router if the destination network is determined to be a physical network.

13. A method of delivering a data packet according to claim 12, including the step of sending a query to the second router if the destination network is a virtual network to determine whether the host is directly reachable by the second router.

14. A method of delivering a data packet according to claim 13 including the steps of:

receiving a response to the query from the second router at the first router;

determining whether the host is directly reachable by the second router from the response; and delivering the data packet to the second router if the host is determined to be directly reachable.

15. A method of maintaining a routing table in a first router in a communication system, the communication system including a second router and a destination network, the destination network being coupled to the second router and including a destination host, the method including the steps of:

determining if the destination network coupled to the second router is a virtual network;

formulating a link state packet for propagation from the second router, the link state packet identifying the destination network as being coupled to the second router;

propagating the link state packet from the second router to the first router;

receiving the link state packet at the first router; and maintaining the routing table in the first router to indicate that the second router is coupled to the destination network and whether the destination network is a virtual network, wherein the step of maintaining the routing table to indicate whether the destination network is a virtual network is performed in response to an indication by the link state packet that the destination network is a virtual network.

16. A method of maintaining a routing table according to claim 15 including the step of including the link state packet in a first set of link state packets propagated to the first router if the destination network is a virtual network, thereby to indicate that the destination network is a virtual network.

17. A method of maintaining a routing table according to claim 15 including the step of including the link state packet in a second set of link state packets propagated to the first router if the destination network is a physical network, thereby to indicate that the destination network is a physical network.

18. A method of maintaining a routing table according to claim 16 wherein information indicating whether the destination network is a virtual network is included in the link state packet.

19. An internetwork system comprising:

a destination network including a destination host;

a first internetwork communication device coupled to the destination network; and a second internetwork communication device including:

an input for receiving a link state packet propagated by the first internetwork communication device over the internetwork system; and a memory device storing routing data indicating whether the destination network is a physical or virtual network, so as to allow the second internetwork communication device to determine whether a data packet, received by the memory device for delivery to the destination host, is for transmission to a physical or a virtual network.

20. An internetwork system according to claim 19 wherein the second internetwork communication device includes routing logic circuitry for controlling the delivery of the data packet to the destination host, the routing logic circuitry being adapted to deliver the data packet directly to the first internetwork communication device if the destination network is a physical network.

21. An internetwork system according to claim 19 wherein the second internetwork communication device includes routing logic circuitry for controlling the delivery of the data packet to the destination host, the routing logic circuitry being adapted to query the first internetwork communication device for a delivery address for the data packet if the destination network is a virtual network.

22. An internetwork system according to claim 19 wherein the first and second internetwork communication devices are routers.

23. A source internetwork communication device for use in an internetwork system including a receiving internetwork communication device coupled to a destination network, the source internetwork communication device comprising:

an input for receiving a link state packet propagated by the receiving internetwork communication device over the internetwork system; and a memory device storing routing data indicating whether the destination network is a physical or virtual network, so as to allow the source internetwork communication device to determine whether a data packet, received by the memory device for delivery to a destination host included in the destination network, is for transmission to a physical or a virtual network.

24. A source internetwork communication device according to claim 23 including routing logic circuitry for controlling the delivery of the data packet to the destination host, the routing logic circuitry being adapted to deliver the data packet directly to the receiving internetwork communication device if the destination network is a physical network.

25. A source internetwork communication device according to claim 23 including routing logic circuitry for controlling the delivery of the data packet to the destination host, the routing logic circuitry being adapted to query the receiving internetwork communication device for a delivery address for the data packet if the destination network is a virtual network.

26. A source internetwork communication device according to claim 23 wherein the source internetwork communication device comprises a router.

* * * * *